United States Patent [19]

Davies et al.

[11] 4,400,182
[45] Aug. 23, 1983

[54] VAPORIZATION AND GASIFICATION OF HYDROCARBON FEEDSTOCKS

[75] Inventors: Haydn S. Davies; James H. Garstang; Cyril Timmins, all of Solihull, England

[73] Assignee: British Gas Corporation, London, England

[21] Appl. No.: 399,230

[22] Filed: Jul. 19, 1982

Related U.S. Application Data

[63] Continuation of Ser. No. 241,617, Mar. 9, 1981, abandoned.

[30] Foreign Application Priority Data

Mar. 18, 1980 [GB] United Kingdom ............... 8009130

[51] Int. Cl.³ ............................................. C07C 9/02
[52] U.S. Cl. .............................. 48/214 A; 208/48 R
[58] Field of Search ............... 48/214 A; 252/373; 208/48 R; 585/733

[56] References Cited

U.S. PATENT DOCUMENTS 3,351,563 11/1967 Negra et al. ................ 48/214 A
3,625,665 12/1971 Thompson ................... 48/214 A Primary Examiner—Peter F. Kratz
Attorney, Agent, or Firm—Larson and Taylor

[57] ABSTRACT

Heavy hydrocarbon feedstocks, e.g. gas oils, are vaporized and subsequently gasified at high temperatures without pyrolytic degradation by first admixing the hydrocarbon with a hot gaseous reactant, e.g. product gas or steam, to bring the temperature of the mixture above that of the dew point of the hydrocarbon and thereafter raising the temperature of the mixture to above that at which pyrolysis of the hydrocarbon begins to be significant by admixture with further quantities of the reactant which are superheated thereby to bring the temperature of the resultant mixture to that required for effecting a catalytic gasification reaction.

2 Claims, 1 Drawing Figure

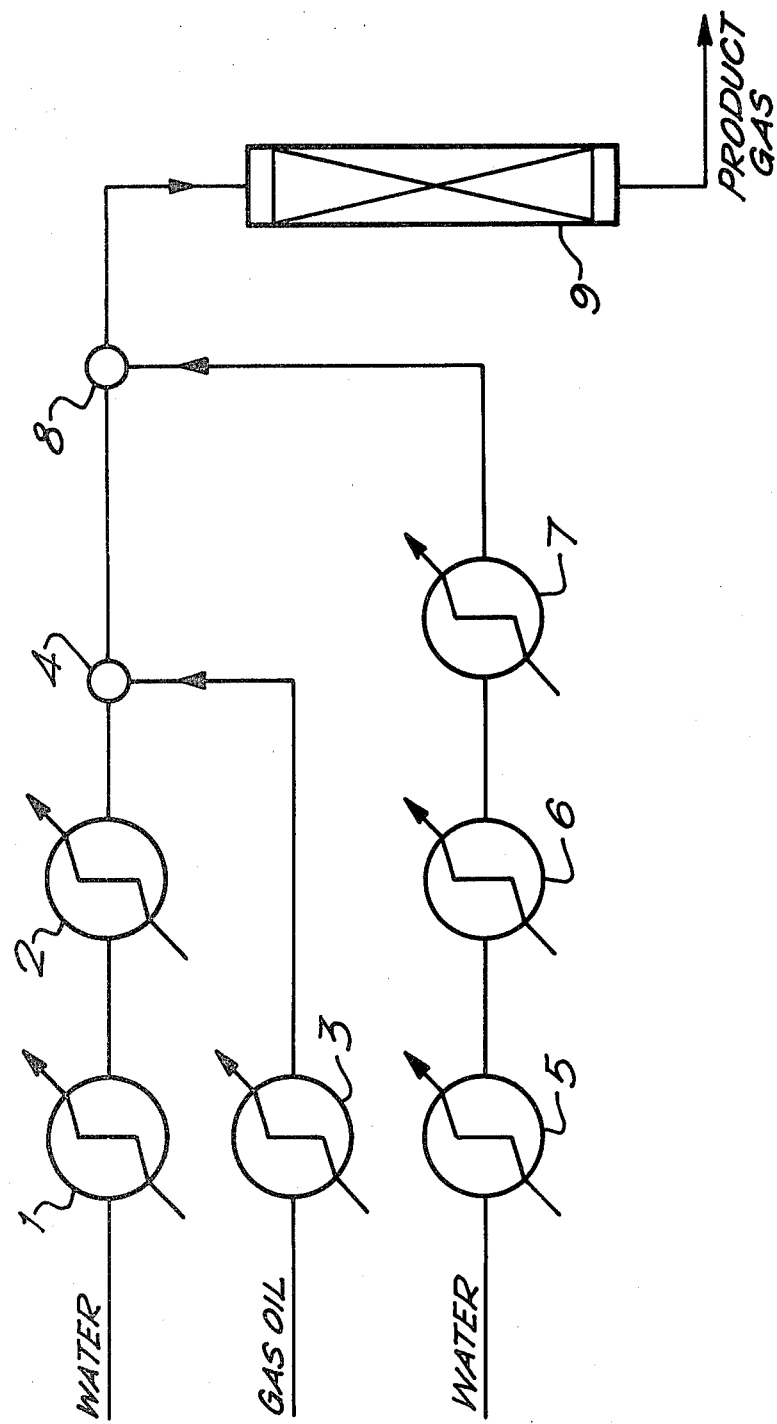

VAPORIZATION AND GASIFICATION OF HYDROCARBON FEEDSTOCKS

This is a continuation of the application Ser. No. 241,617 filed Mar. 9, 1981 now abandoned.

This invention relates to the vaporisation of hydrocarbon materials suitable for catalytic steam reforming reactions. More particularly, the invention relates to the vaporisation of hydrocarbons and super heating of reactant mixtures, particularly heavy distillates, under conditions at which pyrolytic degradation can occur, with a view to gasifying said hydrocarbons in the presence of steam of manufacture methane-containing gases which can be used for the production to substitute natural gas (SNG) and other synthesis and fuel gases.

An example of such a process is the Catalytic Rich Gas process (CRG) described in our U.K. Pat. Specification No. 820,257. However, during this catalytic steam reforming process, catalyst deactivation can occur due to the deposition of polymeric materials on the catalyst. In order to overcome such deleterious effects it is common to raise the inlet or preheat temperature of the reactants entering the catalyst body to control and minimise the polymer formation and deposition. For naphtha feedstocks, final preheat temperatures of about 500° C. are generally sufficient to maintain catalyst activity. The use of heavier feedstocks requires higher preheat temperatures which promotes additional catalyst deactivation problems since hitherto at temperatures above about 550° C. catalyst deactivation by sintering can also occur. Recent developments in catalyst production techniques have gone someway to alleviate the problems of sintering.

For heavier feedstocks it is necessary to have high temperatures in order to promote the steam gasification of such feedstocks. However, the use of such high temperatures can lead to pyrolytic degradation of the feedstock and will cause lay down of carbon or polymer carbonaceous materials on the catalyst surfaces. The extent of pyrolysis, in general, is a function of the temperature to which the hydrocarbon is heated and of the residence time at that temperature.

Heating of steam feedstock mixtures has conventionally been effected in tubular heaters heated by flue gas and by radiant heat. In order to achieve sufficient heating, high heat fluxes are usually required which may result in the occurrence of local hot spots. Because of heat losses in downstream pipework the feedstock has to be heated to greater than the required catalyst working temperature.

Pyrolysis has some beneficial effects since lighter molecules are produced but these advantages are outweighed by the disadvantages of carbon formation and the formation of heavier molecules and polymer species detrimental to catalyst performance leading to heater and reactor blockage.

Hitherto, light feedstocks such as naphtha have presented no problems since it has not been required to heat these to temperatures at which pyrolysis occurs. Kerosine has shown some sensitivity, but no great problems have been encountered. The use of gas oils have caused significant problems since process temperatures required for catalytic gasification of gas oil are within the temperature range at which the rate of pyrolysis becomes significant.

It has been shown that pyrolysis of gas oil begins to occur at temperatures above 450° C., becoming significant at temperatures above about 530° C. The preferred preheat temperature required for gasification and gas oil is 550°–590° C., and even when using lead bath heaters in pilot plant units, a relatively gentle form of heating, significant pyrolysis of the feedstock has been observed.

The invention proposes a process whereby hydrocarbons may be vaporised and superheated without the occurence of pyrolysis to temperatures above which the rate of pyrolysis becomes significant and a process whereby such superheated hydrocarbons are catalytically steam reformed to produce methane-rich gases which may be used for the production of SNG, or other synthesis and fuel gases, eg hydrogen.

Thus, according to the invention there is provided a process for the vaporisation and heating of hydrocarbons to temperatures above which significant pyrolysis occurs, which process comprises introducing said hydrocarbon material into a gas, eg steam, the temperature of the thus formed mixture being above the dew point of the hydrocarbon material but below the temperature at which significant pyrolysis occurs, thereafter injecting gas, at a temperature above the temperature at which the rate of pyrolysis becomes significant into the mixture, the temperature of the mixture also being above that at which the rate of pyrolysis of the hydrocarbon becomes significant.

The present invention also provides a process for the production of methane-containing gases by the catalytic steam reforming of hydrocarbon materials which process comprises forming a mixture of vaporised hydrocarbon and steam at a temperature above that at which the rate of pyrolysis becomes significant by the process as hereinabove described and thereafter passing the thus heated mixture over a coprecipitated catalyst comprising nickel and alumina.

The processes of the invention may be applicable for the vaporisation and superheating of all feedstocks conventionally used in the manufacture of SNG and other synthesis gases, eg the light and heavy naphthas, as well as heavier feedstocks.

However, the processes of the invention are particularly applicable for vaporising, superheating and gasifying the heavier distillates such as kerosine, and the atmospheric gas oils since the temperature required to carry out the gasification reaction is greater than that at which the rate of pyrolysis of the distillate becomes significant.

The processes of the invention are particularly suitable in the production of SNG on a peak load basis where rapid plant start up is required. Where plant is being used for base load gas production the problems of carbon deposition on the reforming catalyst may be somewhat alleviated when using feedstocks which are fully vaporised under the conditions required for hydrodesulphurisation because the feedstock is normally hydrodesulphurised immediately prior to reforming and any carbon formation which takes place during initial vaporisation for hydrodesulphurisation will be deposited on the hydrodesulphurisation catalyst which is normally acceptable from the point of view of catalyst life and pressure drop (a relatively insensitive compound with the reforming catalyst). However, under peak load operation supplies of pre-purified liquid feedstock are stored until they are required. Under baseload operation with feedstocks which are not fully vaporised under hydrodesulphurisation conditions, the feedstock must be fully condensed before metering to the steam reforming plant. Full condensation of the feedstock after hydrodesulphurisation also permits the economic recycling of hydrogen which is needed in this process. Thus when using purified liquid feedstock there has been no safeguard for preventing carbon lay down when using heavy feedstocks on the reforming catalyst until the advent of the present invention.

The hydrocarbon material is, under normal temperature and pressure, a liquid, but is capable of being fully vaporised. The material may be prewarmed prior to admixture with the first amount of gas or steam.

Initial vaporisation of the material, by mixing with hot gas may be accomplished by using one of a number of alternative devices which cause the liquid oil to be atomised into small droplets thereby presenting an extended surface area of oil to the heating medium (eg steam) and effecting its rapid vaporisation. Examples of such devices are:

(1A) A venturi through which superheated steam or gas is passed and into the throat of which is injected the oil to be vaporised;

(2A) A plain pipe section carrying superheated steam or gas into which the oil is atomised by the use of a second small stream of steam at higher pressure via a steam atomising nozzle of which there are a number of proprietary designs;

(3A) A plain pipe section carrying superheated steam of gas into which the oil is atomised under its own pressure though a suitable nozzle.

All three have been employed in the designs of proprietary steam desuperheaters. The second method, which is preferred because of the smaller droplet sizes produced, is also employed in the design of burners for fuel oils (using either steam or air as the atomising medium). The detailed design of atomising nozzles varies considerably, but in general to achieve the smallest droplet sizes it is preferred that the atomising fluid (steam or air) is in choke flow (ie at sonic velocity), although other designs are available using higher mass flow rates at lower velocities.

Having achieved complete vaporisation of the oil, the process of the invention achieves the necessary preheat temperature for gasification by the injection of superheated steam at an appropriate temperature.

Possible modes of operation are:

(1B) Direct injection of an atomised spray of oil into a flow of superheated steam or gas consisting of the total amount necessary for gasification, the temperature of the resultant mixture then being that required for gasification.

(2B) Injection of an atomised spray of oil into a flow of superheated steam or gas consisting of part of the total amount resulting in a mixed temperature sufficiently low to permit recovery of high grade heat from another process stream by heat exchange, and followed by injection of superheated steam in one or more stages to achieve the required preheat temperature. The suerheated steam in multi-stage injection may be at the same or at different temperatures at each stage.

(3B) Injection of an atomised spray of oil into a flow of superheated steam or gas consisting of part of the total amount to achieve vaporisation followed by injection of superheated steam in one or more stages to achieve the required preheat temperature as described above.

In all cases (1B) to (3B) above, part of the initial portion of superheated steam may be generated at higher pressure and used as an atomising medium in the spray nozzle. The atomising medium may, alternatively, be any convenient high pressure gas, eg hydrogen containing gases.

We have found that by utilizing this method vaporising and preheating, the temperature of the steam of a hydrocarbon mixture may be raised to temperatures in excess of 200° C. above the temperature at which pyrolysis of the hydrocarbon begins to become significant, without the local pyrolysis and carbon formation experienced in direct-fired heaters.

In the gasification of the hydrocarbon material to produce methane-containing gases for the manufacture of SNG it is desirable to provide all the process steam requirement at the time of vaporising and superheating the hydrocarbon. Thus, the amount of steam used for vaporising and superheating is fixed by the gasification process parameters rather than constraints due to the actual mixing of the hydrocarbon with the steam.

The catalysts used for the gasification process and the reaction parameters have been described in our prior patent specifications; U.K. Patent Specification No. 1,525,017, U.K. patent application No. 6908/77 (and corresponding U.S. application Ser. No. 878,089 now U.S. Pat. No. 4,185,967) and EPO patent application No. 78 300131.6 (and corresponding U.S. application Ser. No. 923,550 now U.S. Pat. No. 4,216,123).

In these cases where heavy hydrocarbons are to be gasified, they may, prior to vaporisation in accordance with this invention, be desulphurised in accordance with the disclosure in our copending application Ser. No. 115,661, filed Jan. 28, 1980, now U.S. Pat. No. 4,300,999.

Prior to effecting the gasification reaction, feedstock is mixed with steam in accordance with the invention. It is preferred that the steam feedstock mixture is held for the minimum time at its highest temperature siting the mixing point for direct steam injection as close to the inlet of the reactor as is consistent with good mixing. Typically the mixing point is about 10 pipe diameters from the reactor inlet. There are available proprietory in-line static mixing devices which may be used to promote rapid mixing of the reactants as this point.

The invention will be further described with reference to the accompanying drawings and following example:

Referring to the drawing, reaction steam is first produced in boiler 1 and thereafter the steam raised is superheated in superheater 2. Feedstock is first preheated in heater 3 and thereafter mixing with the superheated steam in mixer 4. Within mixer 4, preheated oil is sprayed into the steam thereby vaporising the oil.

Further steam is raised in steam boiler 5 and subjected to superheating in successive stages in superheaters 6 and 7. The superheated second stream of steam is then added directly to the first steam feedstock stream in mixer 8 which is as close as possible to the inlet of the catalytic reactor 9.

It will be seen that the total steam required for the process is raised in two stages.

In a typical example where the overall steam to feed ratio (W/W) is 3 part of steam for every 1 part of feedstock, the steam is raised and superheated in the boiler/superheater system 1,2 to 600° C. and mixed with the feedstock in mixer 4. The feedstock, which is typically a gas oil, is preheated to 250° C. in preheater 3. The steam is superheated in superheater 2 to 600° C. In mixer 4, the preheated oil is sprayed into the steam and thus fully vaporised.

The remaining steam is raised and superheated in the boiler superheater system 5, 6, 7. In this part of the plant, the second stream of steam is first superheated to 600° C. and thereafter (in superheater 7) to 740° C.

The second steam stream is mixed with the first steam feedstock mixture in mixer 8. At that point the overall temperature is significantly higher than that at which the rate of pyrolysis of the feedstock begins to becomes significant.

The total steam feed mixture is then reacted over the catalyst at an inlet temperature of 550° C.

This invention has been described with reference to a single stage gasification process. However, in a preferred form the feedstock is gasified in two parts, a first portion being gasified as hereinbefore described and a second portion being by-passed around the first reactor, mixed with the product from the first reactor and the thus formed mixture introduced into a second reactor. Normally a major part of the total feed is introduced into the first stage.

This arangement, particularly when used for heavy feedstocks, has many process advantages. Firstly, the steam to feedstock ratio for the first stage (typically about 3:1) is in excess of the stoichiometric requirement. The excess steam is required to maintain good catalyst life. However, the excess steam from the first stage can effectively be used in the second stage. The result of using two stages is a lowering of the overall total steam to feed ratio and hence increase in the overall thermal efficiency of the process.

We claim:

1. A process for the production of methane-containing gases by the catalytic steam reforming of normally liquid vaporizable hydrocarbon materials at least as heavy as kerosene which process includes the steps of:
  (a) vaporising and heating said hydrocarbon to a temperature above which significant pyrolysis would be expected to occur by introducing said material into a stream of steam to form a first mixture having a temperature greater than the dew point of the hydrocarbon but below said pyrolysis temperature,
  (b) injecting a further amount of steam, at a temperature greater than the stream of steam used in step (a) and greater than said pyrolysis temperature, into said first mixture to form a second mixture whose temperature is greater than said pyrolysis temperature, said injection of said further amount of steam occurring prior to any reaction of said first mixture,
  (c) thereafter, and prior to any significant pyrolysis of said second mixture, passing said second mixture through a bed of a coprecipitated nickel-alumina catalyst to effect a steam reforming reaction on said hydrocarbon.

2. A process as claimed in claim 1 wherein the hydrocarbon material is a gas oil or kerosine.

* * * * *